(12) United States Patent
Park et al.

(10) Patent No.: US 6,667,961 B1
(45) Date of Patent: Dec. 23, 2003

(54) DEVICE AND METHOD FOR IMPLEMENTING HANDOFF IN MOBILE COMMUNICATION SYSTEM

(75) Inventors: Su-Won Park, Seoul (KR); Soon-Young Yoon, Seoul (KR); Ho-Kyu Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/401,225

(22) Filed: Sep. 22, 1999

(30) Foreign Application Priority Data

Sep. 26, 1998 (KR) .............................. 98-40165

(51) Int. Cl.$^7$ ................................. H04Q 7/00
(52) U.S. Cl. .................. 370/331; 370/208; 455/436
(58) Field of Search ..................... 370/328, 335, 370/342, 441, 208, 331; 455/442, 438, 436, 517, 101; 375/130, 140

(56) References Cited

U.S. PATENT DOCUMENTS

| | | | | |
|---|---|---|---|---|
| 5,533,014 A | * | 7/1996 | Willars et al. | 370/335 |
| 5,586,113 A | * | 12/1996 | Adachi et al. | 370/342 |
| 6,108,369 A | * | 8/2000 | Ovesjo et al. | 375/146 |
| 6,424,618 B1 | * | 7/2002 | Uesugi et al. | 370/342 |

FOREIGN PATENT DOCUMENTS

| | | |
|---|---|---|
| CA | 2252382 | 10/1997 |
| CA | 2208085 | 12/1997 |

OTHER PUBLICATIONS

Canadian Office Action dated Jan. 21, 2003, issued in a counterpart application, namely, Appln. No. 2,311,508.

* cited by examiner

*Primary Examiner*—Dwayne Bost
*Assistant Examiner*—Eliseo Ramos-Feliciano
(74) *Attorney, Agent, or Firm*—Dilworth & Barrese, LLP

(57) ABSTRACT

A handoff implementing device and method in a mobile communication system. The handoff implementing device including a base station transmitter and a mobile station receiver. The base station transmitter divides a given frame period into a transmission period and a non-transmission period, separates frame data in the frame period into first and second data, spreads the first and second data by different orthogonal codes, and transmits the spread signal in the transmission period. The mobile station receiver receives the first and second data spread by the different orthogonal codes in the transmission period, assembles the first and second data into the frame data, and searches for an adjacent base station to which a call is handed off in the non-transmission period.

6 Claims, 15 Drawing Sheets

DEVICE AND METHOD FOR IMPLEMENTING HANDOFF IN MOBILE COMMUNICATION SYSTEM

BACKGROUND OF THE INVENTION

1. Field of the Invention

The present invention relates generally to communication systems, and in particular, to a method and apparatus for performing a handoff.

2. Description of the Related Art

In a mobile communication environment, as a user moves from the coverage area of one base station to the coverage area of another base station, a handoff must occur to transition the communication link from one base station to the next. Handoff determinations are typically made based on signal strength measurements by mobile stations of pilot signals transmitted by respective base stations. If the measured pilot signal strength of the present base station falls below a threshold, the mobile station transmits a pilot strength measurement message (PSMM) which is forwarded to a transceiver and selector bank (TSB) of a base station controller (BSC). The base station controller then determines what type of handoff should be performed.

Handoffs are generally classified into two types. The first type is known as a soft handoff. For a soft handoff, a mobile station MS simultaneously maintains connection with two or more base stations (i.e. make before break). That is, as the mobile moves from its current cell (source cell) to the next cell (target cell), a traffic channel is simultaneously maintained with both cells. A soft handoff usually occurs when a mobile station travels from one cell to another cell served by the same BSC, where the base station of the second cell uses the same frequency assignment as the first.

The second type of handoff, hard handoff, is an abrupt handoff in which the mobile station is not controlled simultaneously by two or more base stations. Unlike the soft handoff, the call link connected to the mobile station is not continuously maintained, it is instead, cut-off from a base station located in a source cell and then re-established in a very short time frame with a base station from a target cell (i.e. break before make).

A conventional handoff in a mobile communication system will be described with reference to FIG. 1.

Before describing a conventional handoff procedure, terms used herein will be defined.

Mode 0 (BS transmission mode 0 and MS reception mode 0): A BS normally transmits data for the entire frame period and an MS receives the data.

Mode 1 (BS transmission mode 1 and MS reception mode 1): The BS transmits data for a part of the frame period and the MS received the data.

Mode 2 (BS transmission mode 2 and MS reception mode 2): During part of the frame period where the BS is not transmitting data, the MS searches for an adjacent BS.

A guard time required to transit from mode 1 to mode 2 is called a and a guard time required to transit from mode 2 to mode 1 or mode 0 is called b.

First frame: The first frame transmitted to the MS by the BS upon request for a handoff.

Second frame: A frame following the first frame.

Slotted Mode (Compressed Mode): An operation mode of the BS in which the BS divides a frame period into time slots and transmits data only in selected slots. A data transmission period is called an action period in the slotted mode and a non-data transmission period is called a non-action period in the slotted mode.

FIGS. 1A and 1B illustratively depict a conventional handoff in slotted mode 1 and in slotted mode 2, respectively.

Referring to FIG. 1A, a BS communicates with an MS in mode 0 in step 100. Mode 0 is a transmission scheme in which data at a transmission rate RD is spread by a layer-m orthogonal code and transmitted for a frame period T. Upon require for a handoff, the BS doubles the data transmission rate, spreads data by a layer-(m−1) orthogonal code for the first half of the frame period for transmission, and transmits no data for the last half of the frame period, in steps 110 and 120. Therefore, the MS receives the data from the BS for the first half of the frame period at the doubled data transmission rate and searches for an adjacent target BS to which a handoff will occur for the last half frame period. Then at steps 130 and 140, the BS transmits data spread by the layer-(m−1) orthogonal code at the doubled data transmission rate for the first half frame period and then transmits no data for the last half frame period. Once again, the MS receives the data from the BS for the first half frame period and then searches for the adjacent BS to which a handoff will occur for the last half frame period.

As stated above, upon require for a handoff, the BS transmits data for the first half of the first and second frame period, and the BS does not transmit any data to the MS in the last half of the first and second frame periods, to allow the MS to search for an adjacent BS, in slotted mode.

Now referring to FIG. 1B, the BS communicates with the MS in mode 0 in step 200. Mode 0 is a transmission scheme in which data at the transmission rate RD is spread by the layer-m orthogonal code and transmitted for the frame period T. Upon require for a handoff, the BS doubles the data transmission rate, spreads data by the layer-(m−1) orthogonal code for the first half of the first frame period for transmission in step 210, and transmits no data for the last half of the first frame period 220. T Therefore, the MS receives the data from the BS for the first half of the first frame period 210 and searches for an adjacent target BS in last half of the first frame and first half of the second frame period 220. Then, in steps 220 and 230, the BS transmits no data for the first half of second frame period and transmits data spread by the layer-(m—1) orthogonal code at the doubled data transmission rate for the last half of second frame period 230. That is, upon request for a handoff, the BS transmits data for the first half of the first frame period and the last half of the second frame period, and the MS searches for the adjacent BS in the last half of the first frame period and the first half of the second frame period without receiving data, in slotted mode 2.

FIG. 2 illustrates orthogonal code layers which have variable spread gains and maintain orthogonality among channels.

Referring to FIG. 2, orthogonal codes in the same layer are mutually orthogonal and orthogonal codes in a direct line are not orthogonal. Therefore, either a direct upper layer (m+k) (k=0, 1, 2, . . . ) orthogonal code or a direct lower layer (m−k) (k 0, 1, 2, . . . , m) orthogonal code cannot maintain orthogonality among channels with respect to a layer-m (m=0, 1, 2, . . . ) orthogonal code.

FIGS. 3A and 3B illustrate orthogonal code layers to describe an upper layer orthogonal code assigning method when a conventional handoff between frequencies is to be implemented. In the drawings, orthogonal codes marked with rectangles (in layer 3) represent the current handoff candidate (i.e., requiring a handoff) and orthogonal codes marked with oval circles have assigned to channels in current communication.

Referring to FIGS. 3A and 3B, it is assumed that while the BS transmits using an orthogonal code 00000000, a handoff occurs. If an orthogonal code 0000 in the direct upper layer is available as shown in FIG. 3A, the BS transmits data with use of 0000. However, if the orthogonal code 0000 cannot be assigned due to an orthogonal code 00001111 in current use as shown in FIG. 3B, the BS detects an orthogonal code available among other orthogonal codes in the direct upper layer. Recall that orthogonal code 0000 in FIG. 3B cannot be assigned because it is in a direct line with 00001111, which it is not orthogonal each other. Then, the BS determines that orthogonal code 0011 is available and is not in a direct line with code 00001111 and transmits data with use of the orthogonal code 0011. In this case, different orthogonal codes may be used in steps 100 and 150 of FIG. 1A and in steps 200 and 240 of FIG. 1B. The probability of using a different orthogonal code from an orthogonal code in a previous period is higher in FIG. 3B than in FIG. 3A because the original orthogonal code can be used all the time due to use of the orthogonal code in the direct upper layer in the case shown in FIG. 3A. On the other hand, if the original orthogonal code is assigned to another channel in the slotted mode, it is impossible to return the original orthogonal code in the case of FIG. 3B.

A conventional hard handoff procedure will be described referring to FIG. 4.

A current BS ($BS_0$) transmits data for the entire frame period T in step 411 and a mobile station (MS) receives the data in step 413. The BS continues communication with the MS in step 415. The MS measures the strength of a signal received from the BS in step 417, and notifies the BS of the measurement if the signal strength is at the threshold level or below in step 419. Then, the BS determines whether a handoff is required based on the measurement in step 421. Upon require for a handoff, the BS goes to step 423. Otherwise, if the BS determines that no handoff has been requested, the BS returns to step 411 in which it transmits data for a time T again. In step 423, the BS determines whether there is an available orthogonal code in a direct upper layer. If an orthogonal code currently in use is in layer 2, the BS determines whether there is A any available orthogonal code in layer 1. In the presence of an available orthogonal code, the BS goes to step 425, and otherwise, it awaits generation of an available orthogonal code in the direct upper layer in step 423. That is, the handoff cannot be performed until an available orthogonal code is generated. In step 425, the BS transmits to the MS various parameters (e.g., orthogonal code, transmission period and non-transmission period) required for the handoff. Then, the MS receives the handoff-related information in step 427 and notifies the BS of the reception status in an acknowledgment signal ACK in step 429. The BS determines whether the acknowledgment signal ACK has been received from the MS in step 431. Upon reception of the signal ACK, the BS goes to step 433, and otherwise, it returns to step 425 to resume transmission of the handoff-related information. In step 433, the BS spreads data at a doubled transmission rate, $T/T_{on}$, where $T_{on}$ is T/2 and thus $T/T_{on}$ is 2, using the orthogonal code in the upper layer and transmits the spread data for a time $T_{on}$ in the first half period D1 of a first frame. Then, the MS receives the spread data in the first half period D1 and a signal from an adjacent BS for the last half period D2 of the first frame to thereby search for a new BS for the handoff in step 435.

Referring to FIG. 5, a problem with the conventional handoff procedure described above is that an orthogonal code in the upper layer cannot be assigned in the case where a channel using an orthogonal code 00000000 in layer 3 temporarily increases its data transmission rate to implement a handoff. For example, the orthogonal code 0000 in layer 2 is not available due to an occupied orthogonal code 00001111 in layer 3. Similarly, an orthogonal code 0011 in layer 2 is not available due to an occupied orthogonal code 00110011 in layer 3. An orthogonal code 0101 in layer 2 is in current use and an orthogonal code 0110 in layer 2 cannot be assigned due to an occupied orthogonal code 01101001 in layer 3. That is, no orthogonal codes in layer 2 are available to maintain orthogonality. Therefore, the handoff cannot be performed until an available orthogonal code in layer 2 is generated. This problem can be overcome by separately reserving orthogonal codes in the upper layer for the handoff. However, the orthogonal code reservation decreases channel use efficiency when the frequency of handoff occurrences is low, and is inefficient in a system supporting a variable data rate since different orthogonal codes are needed at different data rates.

FIG. 6 illustrates another conventional handoff implementing method. Referring to FIG. 6, if the orthogonal code 00001111 in layer 3 is assigned to a channel in current use the orthogonal code 0000 in the direct upper layer (i.e., layer 2) is not available, then either orthogonal code 00111100 or 01100110 available in the same layer will then be assigned for the channel that uses orthogonal code 00001111. That is, the orthogonal code 00001111 is returned and the orthogonal code 0000 is assigned to a channel for the handoff. To ensure a reliable handoff, a control signal should be used between the BS and the MS in this method. If a handoff is implemented with the orthogonal code 00110011 during a call in progress with the newly assigned orthogonal code 00111100, the above procedure should be performed again.

SUMMARY OF THE INVENTION

It is, therefore, an object of the present invention to provide a hard handoff implementing device and method in a mobile communication system, in which a frame period is divided into a transmission period and a non-transmission period and frame data is spread with a multicode for transmission in the transmission period when the upper layer orthogonal code cannot be assigned.

The above object is achieved by a handoff implementing device and method in a mobile communication system. The handoff implementing device includes a base station transmitter and a mobile station receiver. The base station transmitter divides a given frame period into a transmission period and a non-transmission period, separates frame data in the frame period into first and second data, spreads the first and second data by different orthogonal codes, and transmits both spread signals in the transmission period. The mobile station receiver receives the first and second data spread by the different orthogonal codes in the transmission period, assembles the first and second data into the frame data, and searches for an adjacent base station to which a call is handed off in the non-transmission period.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1A:
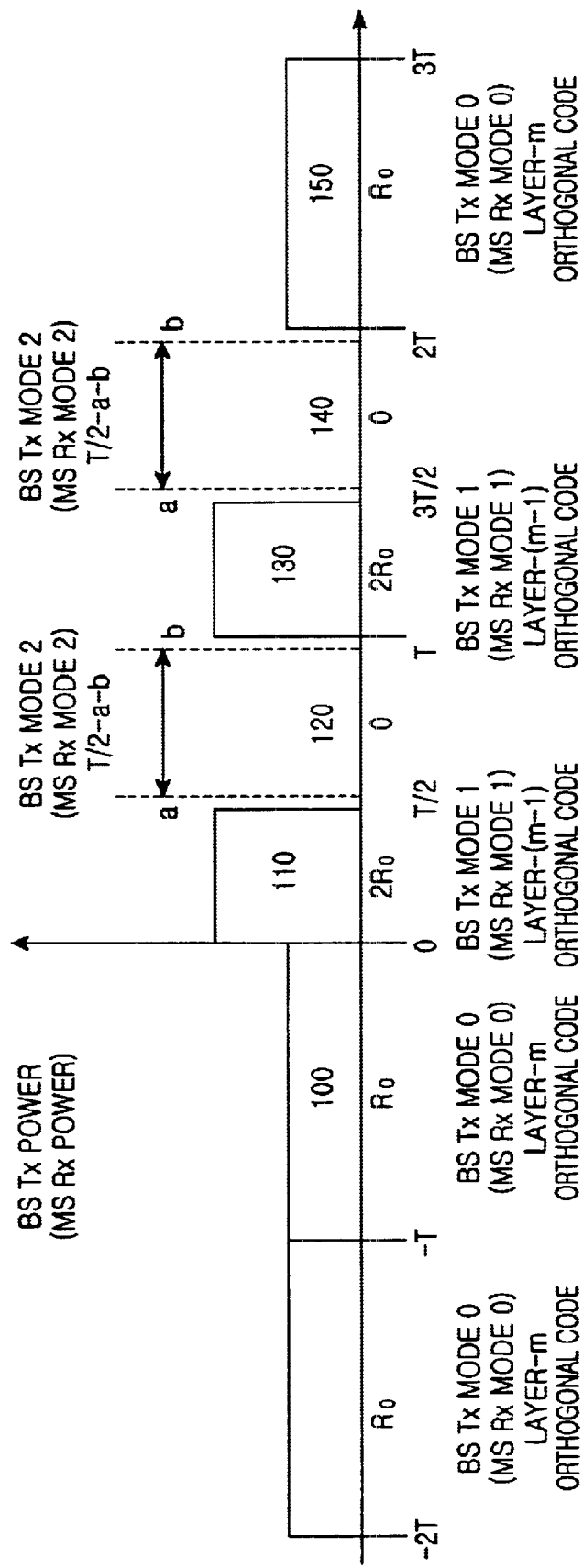
FIGS. 1A and 1B illustratively depict a conventional handoff in slotted modes in a mobile communication system.
Figure 1B:
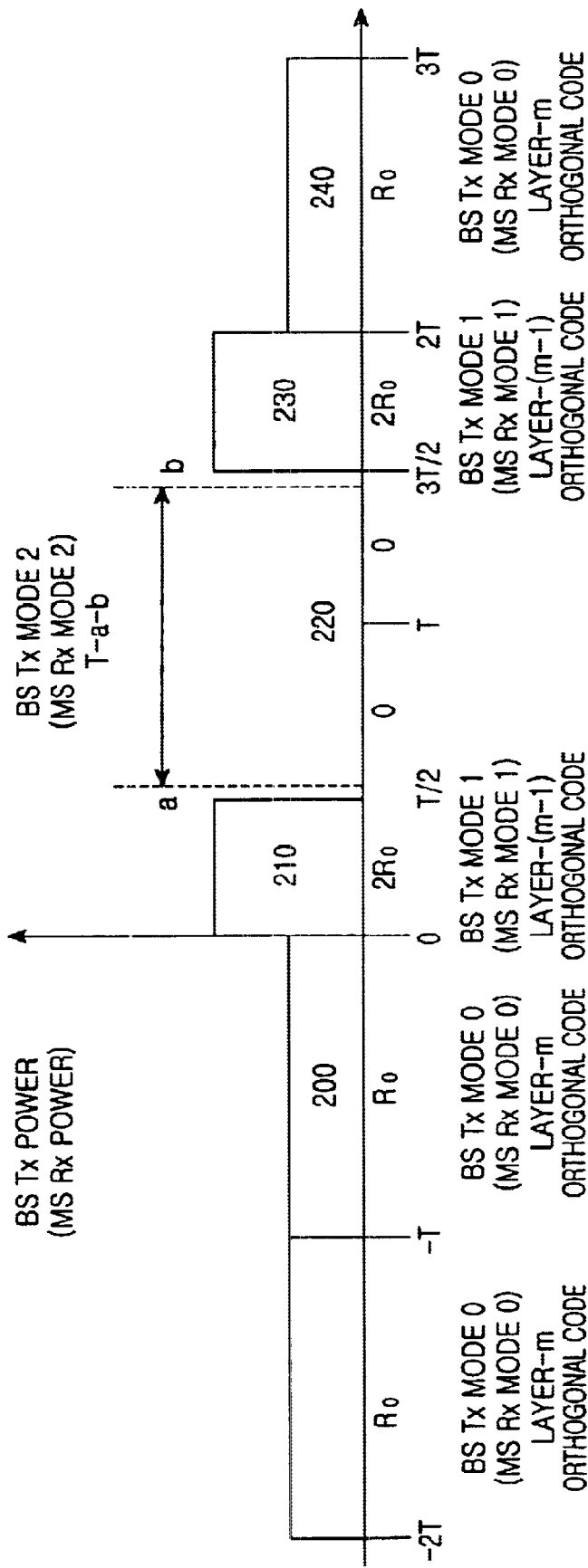
Figure 2:
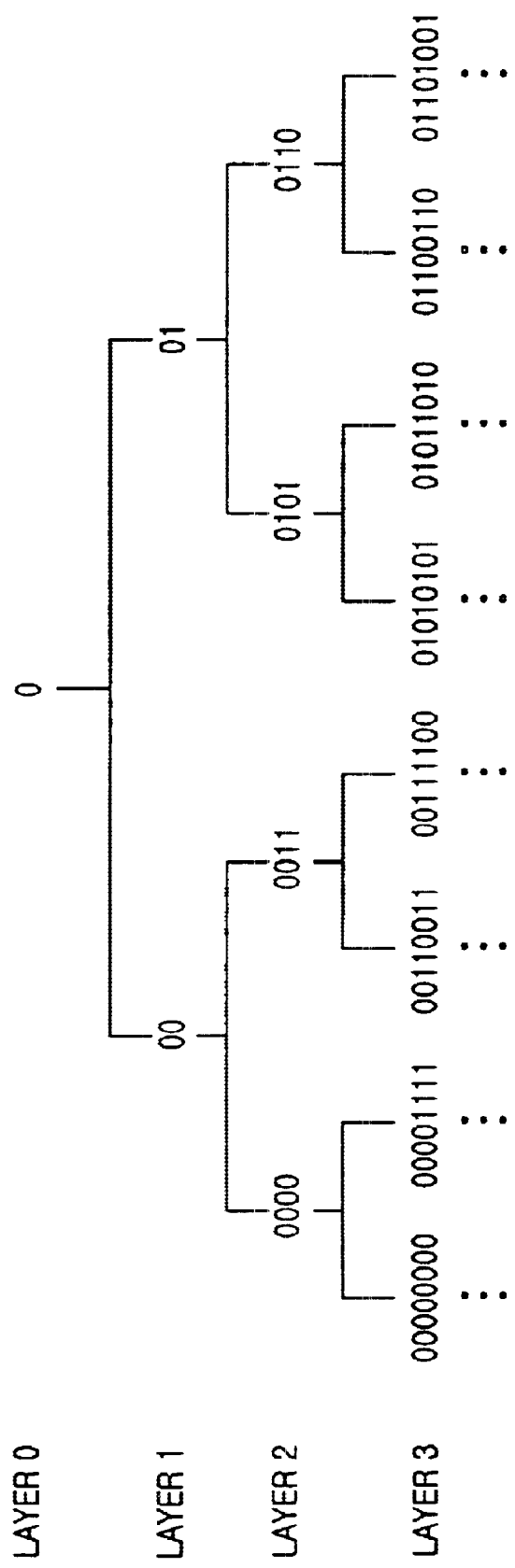
FIG. 2 illustrates orthogonal codes having variable spread gains in a plurality of layers.
Figure 3A:
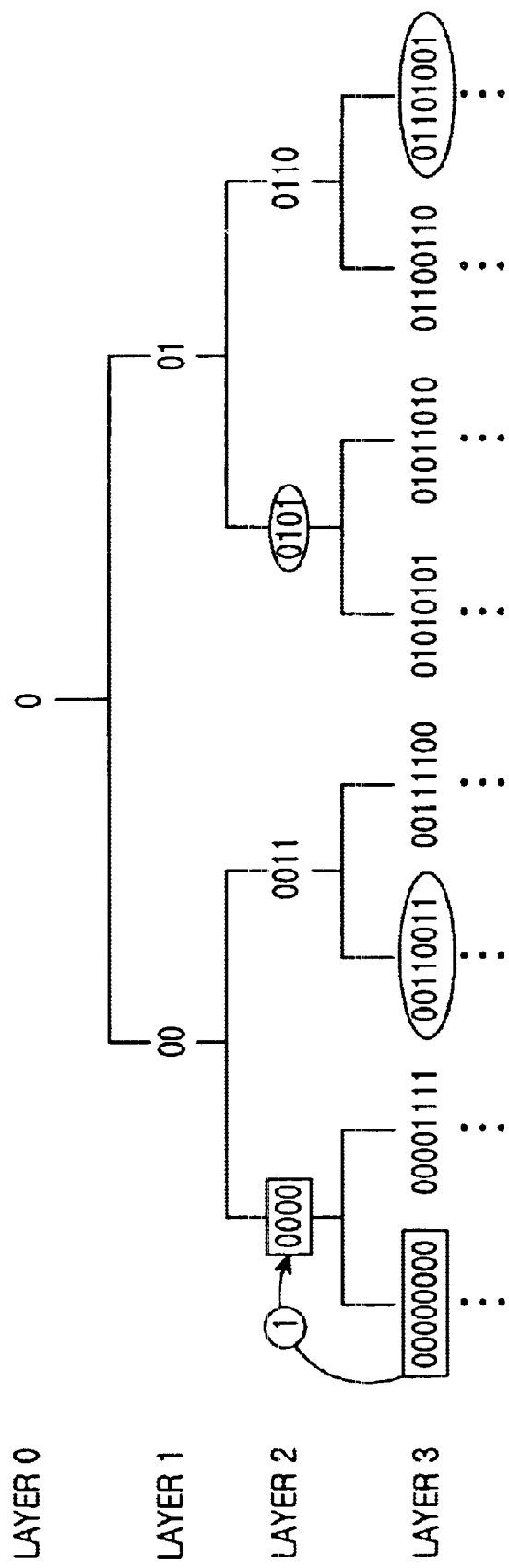
FIGS. 3A and 3B are views referred to for describing the cases that orthogonal codes in an upper layer can be assigned for a handoff in a conventional mobile communication system.
Figure 3B:
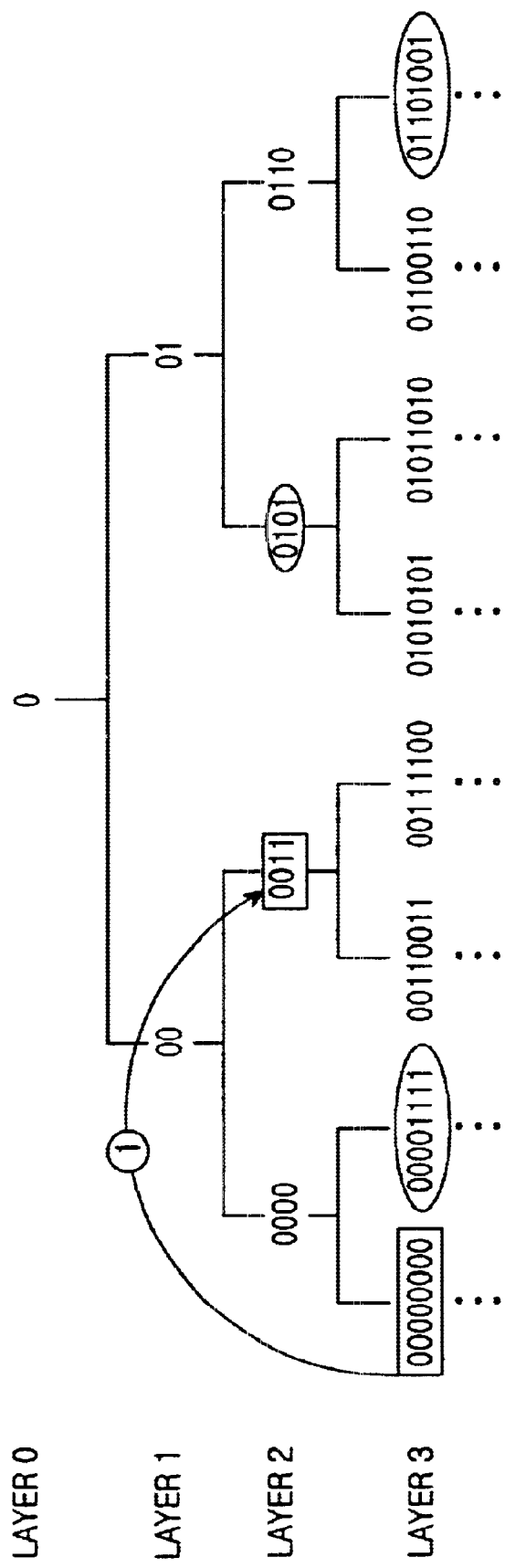
Figure 4:
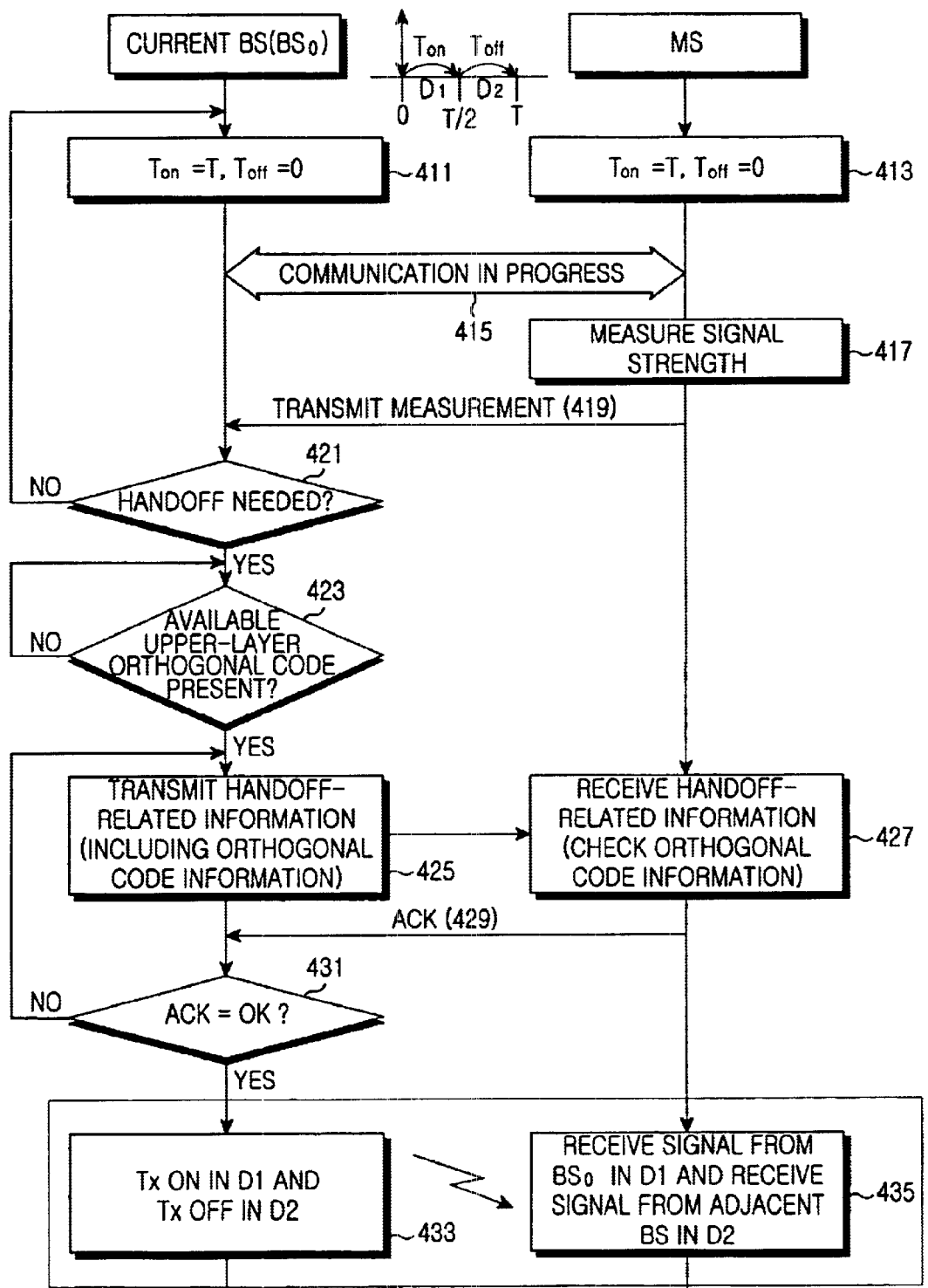
FIG. 4 is a flowchart depicting a conventional handoff implementing procedure using only variable spread gains in the mobile communication system.
Figure 5:
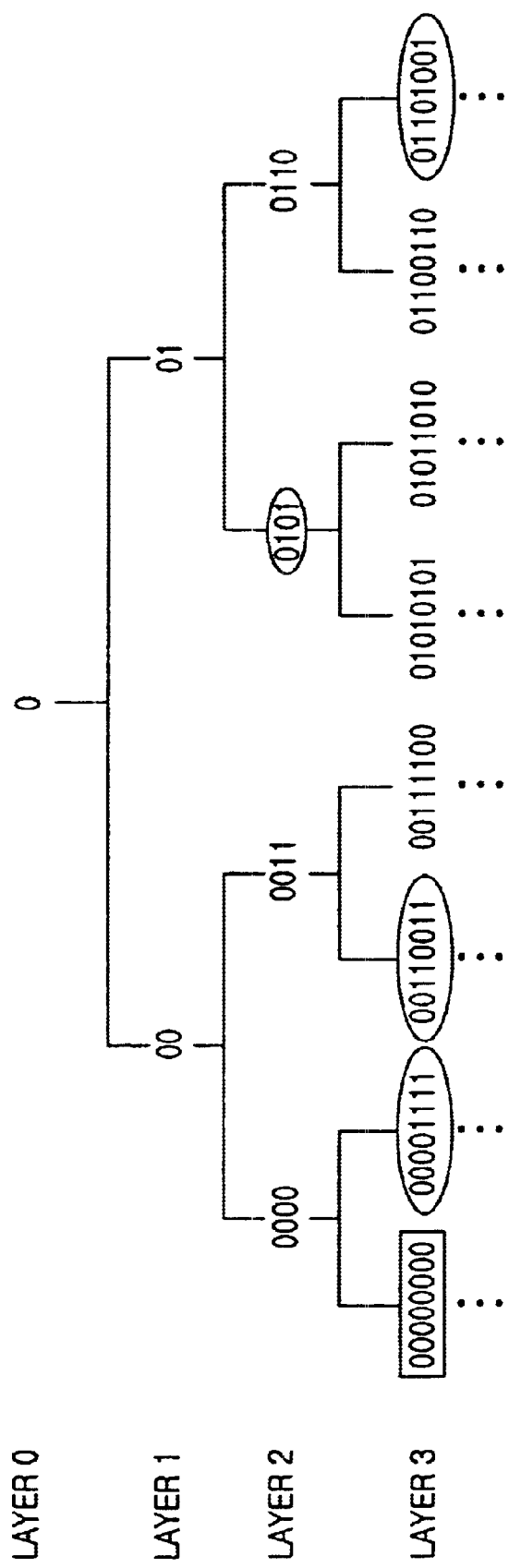
FIG. 5 is a view referred to for describing the case that an orthogonal code in an upper layer cannot be assigned for a handoff in the conventional mobile communication system.
Figure 6:
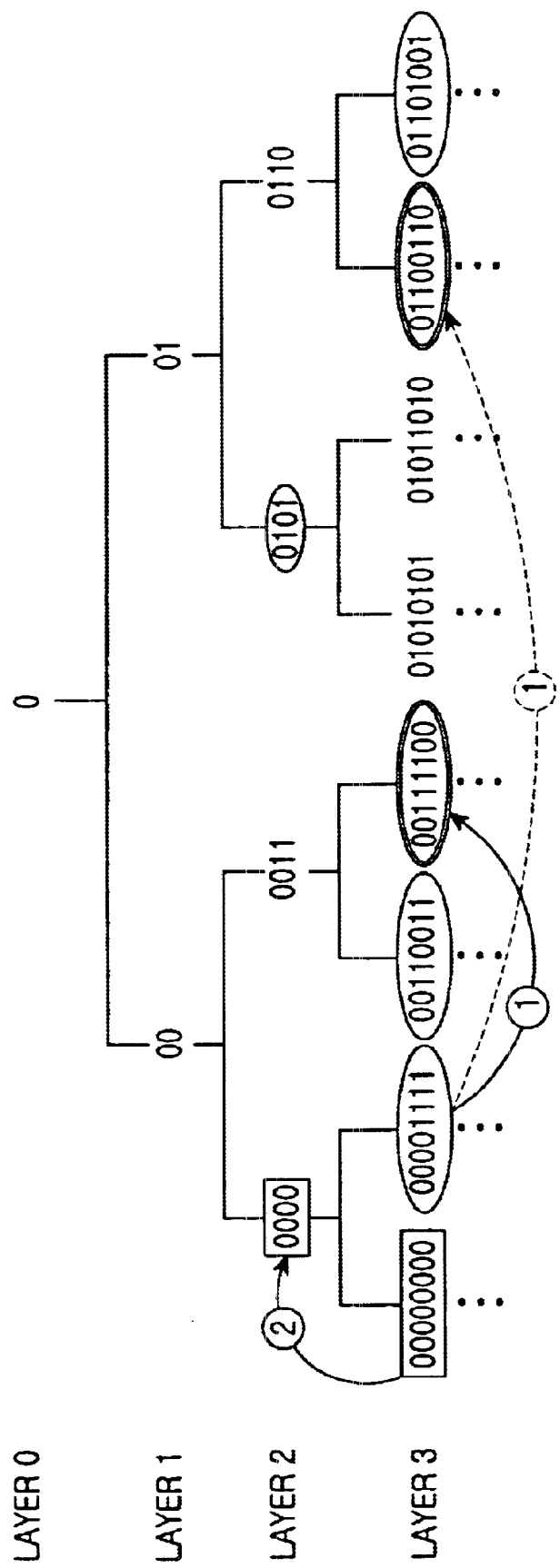
FIG. 6 is a view referred to for describing assignment of a different orthogonal code to a channel using an orthogonal code in the same layer to assign an orthogonal code of an upper layer for a handoff in the conventional mobile communication system.
Figure 7:
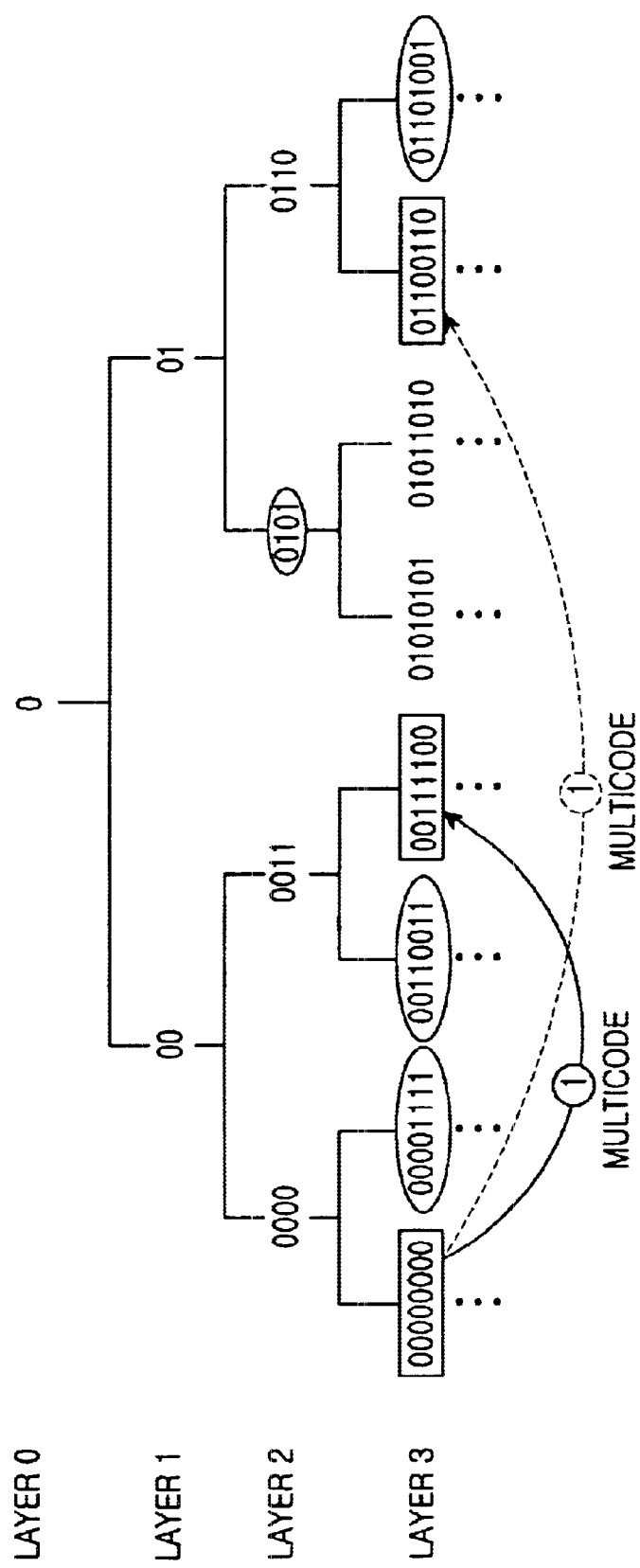
FIG. 7 is a view referred to for describing a multicode scheme in a mobile communication system according to the present invention, in which a different orthogonal code in the same layer is assigned for a handoff.

FIG. 7 illustratively depicts a handoff implementing method in a multicode scheme in a mobile communication system according to the present invention.

Referring to FIG. 7, upon request for a handoff during a call using a layer-3 orthogonal code 00000000, an available orthogonal code 00111100 or 01100110 in the same layer is additionally assigned and the additional orthogonal code is used only in a slotted mode in a multicode scheme. In this case, when the slotted mode ends, the original code 00000000 can be used again. Hence, no additional control signal for reassignment of an original orthogonal signal is necessary except that a control signal for the additionally assigned orthogonal code is needed. While a multicode scheme with two orthogonal codes is described herein, the slotted mode can be activated in a multicode scheme using more than two orthogonal codes.

Figure 8A:
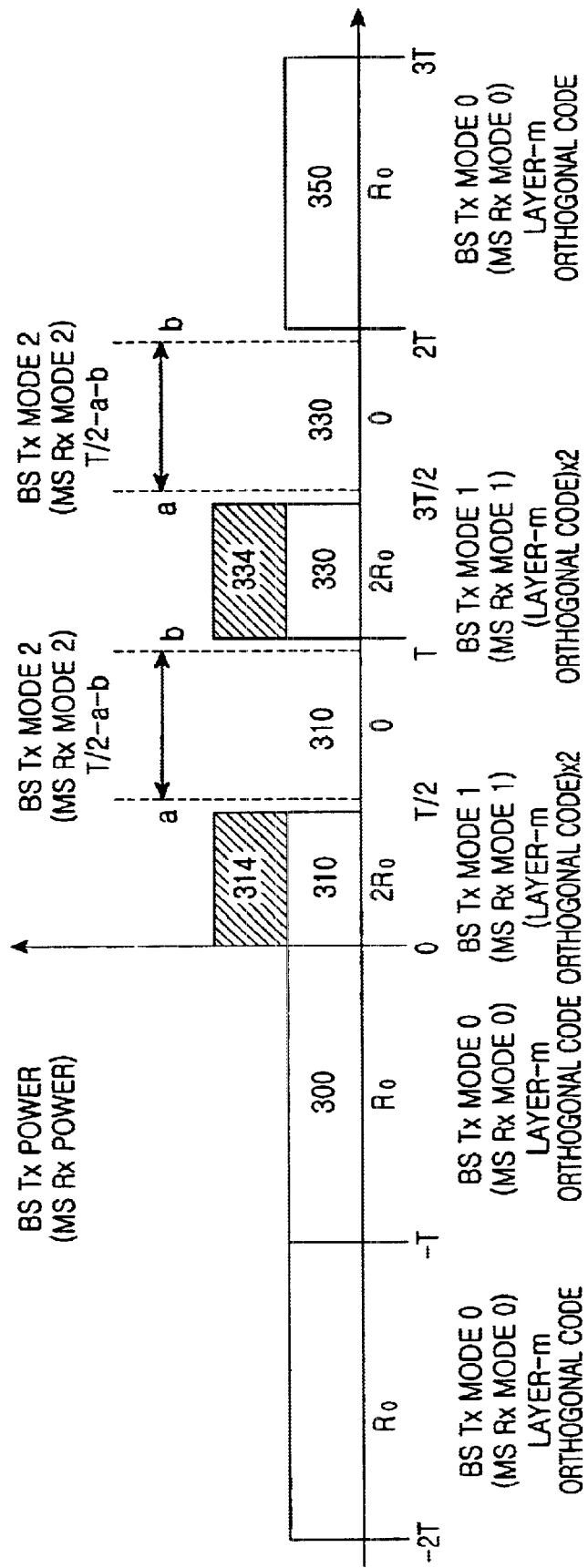
FIGS. 8A and 8B exemplarily illustrate applications of a handoff implemented in the multicode scheme to slotted modes in the mobile communication system according to the present invention.
Figure 8B:
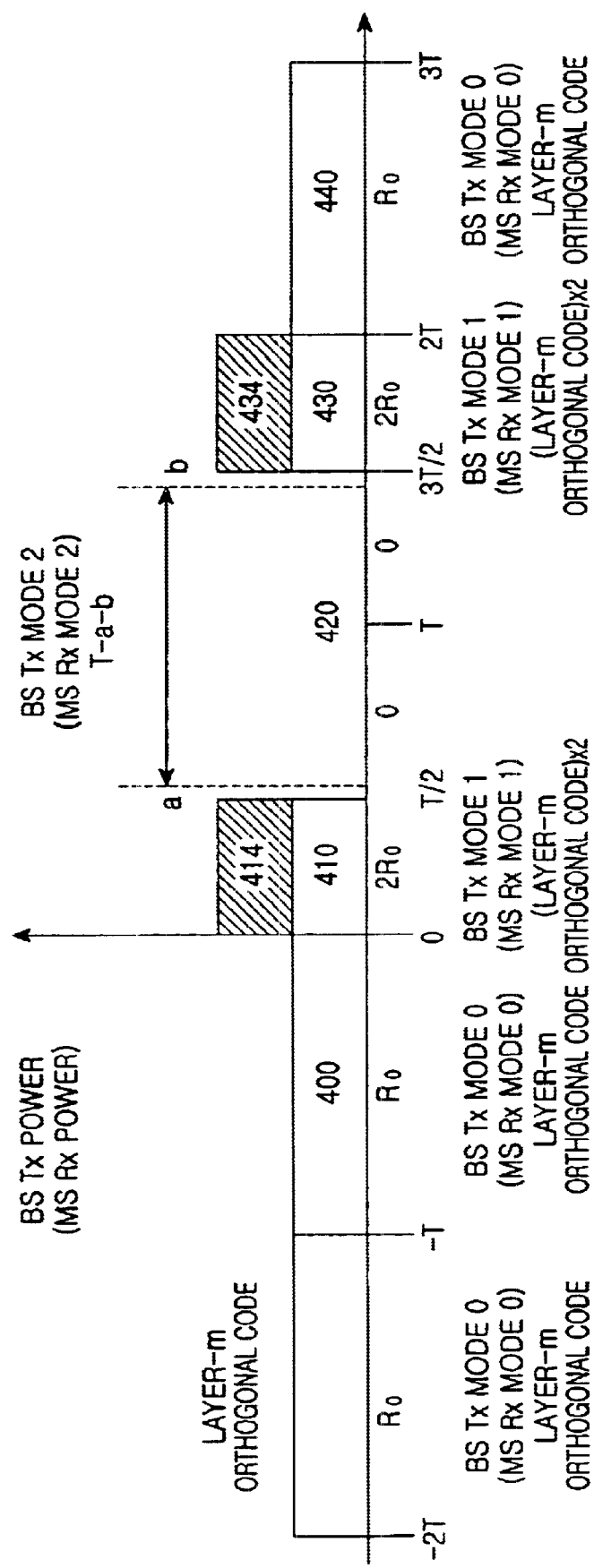

The above handoff implementation in the multicode scheme is embodied in slotted mode 1of FIG. 8A or in slotted mode 2of FIG. 8B. Referring to FIG. 8A, a BS communicates with an MS in step 300. Here, mode 0is a mode in which data of a transmission rate RD is spread with a layer-m orthogonal code and transmitted for the frame period T. In step 310, upon request for a handoff, the BS transmits data at a doubled transmission rate for the first half of a frame period and transmits no data for the last half of the frame period. Here, the BS assigns two layer-m orthogonal codes for transmission of data in the multicode scheme for the first half frame period. The MS receives the data from the base station for the first half frame period and searches for an adjacent BS. In steps 310 and 330, the BS transmits data at the doubled transmission rate for the first half of a frame period and transmits no data for the last half of the frame period. Here, the base station assigns two layer-3 orthogonal codes for transmission of data in the multicode scheme for the first half frame period. The MS receives the data from the base station for the first half frame period and searches for an adjacent BS to which a call is handed off for the last half frame period.

As stated above, upon request for a handoff, the BS assigns two orthogonal codes in the same layer (i.e., the same orthogonal code as that used in mode 0 and an additional orthogonal code in the same layer) and transmits data in the multicode scheme for the first half of the first frame period and the first half of the second frame period. The MS searches for an adjacent BS for the last half of the first frame period and the last half of the second frame period. In other words, two orthogonal codes in the same layer are assigned without using an orthogonal code in an upper layer due to a change (i.e., doubling) the data transmission rate, for transmission of data in the multicode scheme.

Now referring to FIG. 8B, the BS communicates with the MS in mode 0 in step 400. Mode 0 is a transmission scheme in which data at the transmission rate RD is spread by a layer-m orthogonal code and transmitted for the frame period T. Upon request for a handoff, the BS doubles the data transmission rate, spreads data by two layer-m orthogonal codes for the first half of a first frame period 414, 414 for transmission in the multicode scheme, and transmits no data for the last half of the first frames period, in step 420.

Therefore, the MS receives the data from the BS for the first half of the first frame period and searches for an adjacent new BS in which a handoff occurs for the last half frame period. Then, the BS transmits no data for the first half of a frame period and transmits data spread by two layer-m orthogonal codes at the doubled data transmission rate for the first half of the frame period in steps 430 and 440.

As described above, upon request for a handoff, the BS transmits data for the first half of the first frame period and the last half of the second frame period, and the MS searches for the adjacent BS in the last half of the first frame period and the first half of the second frame period without receiving data, in slotted mode 2. In other words, upon request for a handoff, the BS assigns two orthogonal codes in the same layer for transmission of data in the multicode scheme, without using an orthogonal code in an upper layer due to a change in the data transmission rate.

In accordance with the present invention, two cases are considered for increasing a data transmission rate while maintaining orthogonality among channels: one is where an orthogonal code in an upper layer can be assigned and the other is that an orthogonal code in an upper layer cannot be assigned. In the former case, two options exist. First, the orthogonal code in the upper layer is simply assigned or alternatively, the multicode scheme is used. In the latter case where an orthogonal code in an upper layer cannot be assigned, the multicode scheme must be used. While the description of the present embodiment of the present invention is confined to a hard handoff, it should be appreciated that the present invention is applicable to a communication system for maintaining orthogonality among channels despite a change of a data transmission rate during a call, such as a selective channel encoding scheme according to channel states.

In addition, a data transmission rate is increased twice in the description of the present invention, but it is possible to change a data transmission rate by integer power of two when an orthogonal code with a variable spread gain is assigned, and to change a data transmission rate by an integer-multiple in a multicode scheme.

Figure 9:
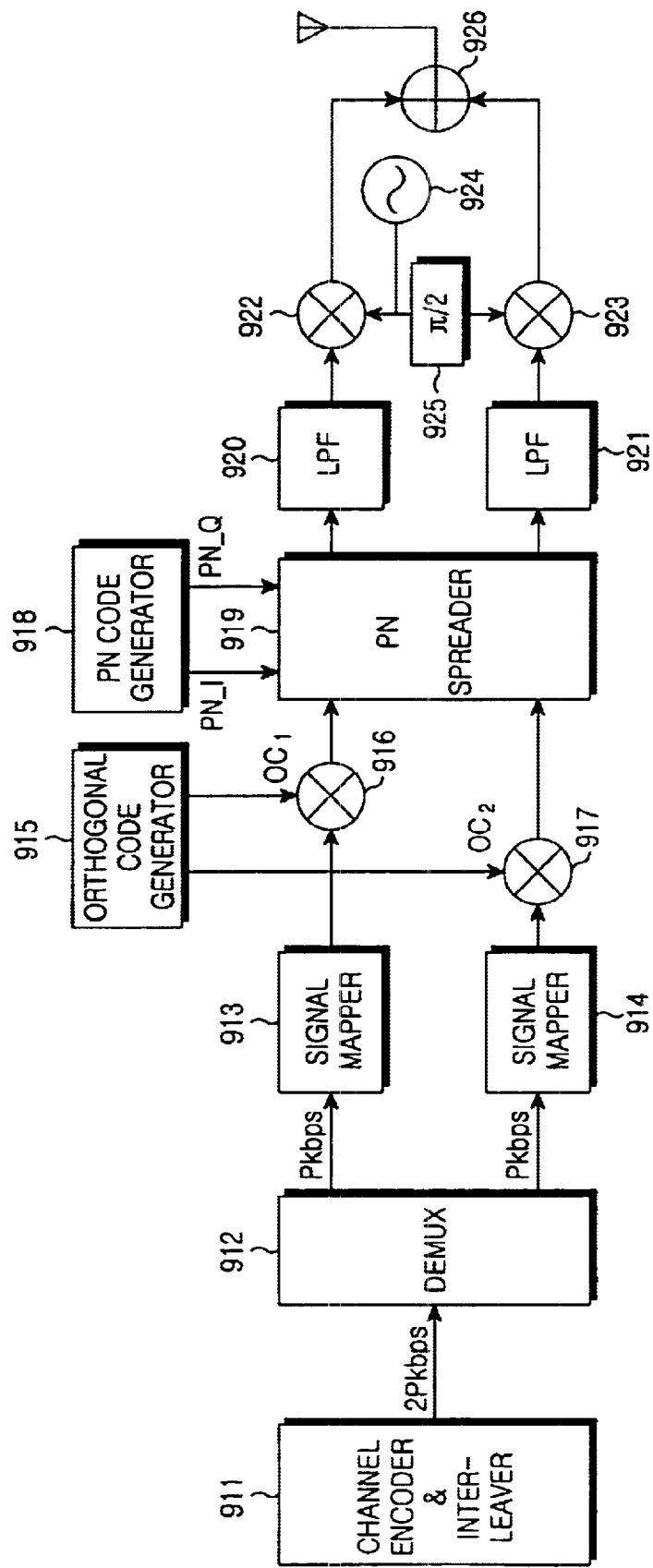
FIG. 9 is a block diagram of a BS transmitter operating in the multicode scheme in a mobile communication system according to an embodiment of the present invention.

FIG. 9 is a block diagram of a BS transmitter operating in a multicode scheme according to an embodiment of the present invention. Here, two orthogonal codes are used by way of example.

Referring to FIG. 9, a channel encoder & interleaver 911 is a typical channel encoder & interleaver for increasing the reliability of a signal received on a communication channel. A demultiplexer (DEMUX) 912 is a switch for separately outputting odd-numbered symbols and even-numbered symbols from input symbols to transmit data with a plurality of codes. While two orthogonal codes are used for transmission of data by way of example in the present embodiment, it should be understood that a multicode scheme can be achieved in which more than two orthogonal codes are assigned. Signal mappers 913 and 914 receive the odd-numbered symbols and the even-numbered symbols from the DEMUX 912 and map logical signals 0s and 1s to actual transmission signals+1s and–1s. An orthogonal code generator 915 generates orthogonal codes for providing orthogonal channelization among a plurality of transmission channels. The orthogonal code generator 915 generates a first orthogonal code OC1 and a second orthogonal code OC2 mutually orthogonal in the same layer to mixers 916 and 917, respectively. The orthogonal code generator 915 is assumed to generate the orthogonal codes with elements+1, –1. The mixer 916 multiplies the output of the signal mapper 913 by the first orthogonal code OC1. The mixer 917 multiplies the output of the signal mapper 914 by the second orthogonal code OC2. A PN (Pseudorandom Noise) code generator 918 generates two PN codes PN_I and PN_Q. A complex PN spreader 919 performs complex multiplication between the outputs of the mixers 916 and 917 and the PN codes PN_I and PN_Q received from the PN code generator 918. Low pass filters (LPFs) 920 and 921 are typical LPFs for limiting a transmission signal to a specific bandwidth. A carrier generator 924 generates a carrier for a signal to be transmitted. A 90° phase shifter 925 shifts the phase of the output of the carrier generator 924 by 90° to ensure orthogonality between the I channel and the Q channel. A mixer 922 multiplies the outputs of the LPF 920 and the carrier generator 924. A mixer 923 multiplies the outputs of the LPF 921 and the 90° phase shifter 925. An adder 926 adds the outputs of the mixers 922 and 923 and transmits the added signal through an antenna.

Figure 12:
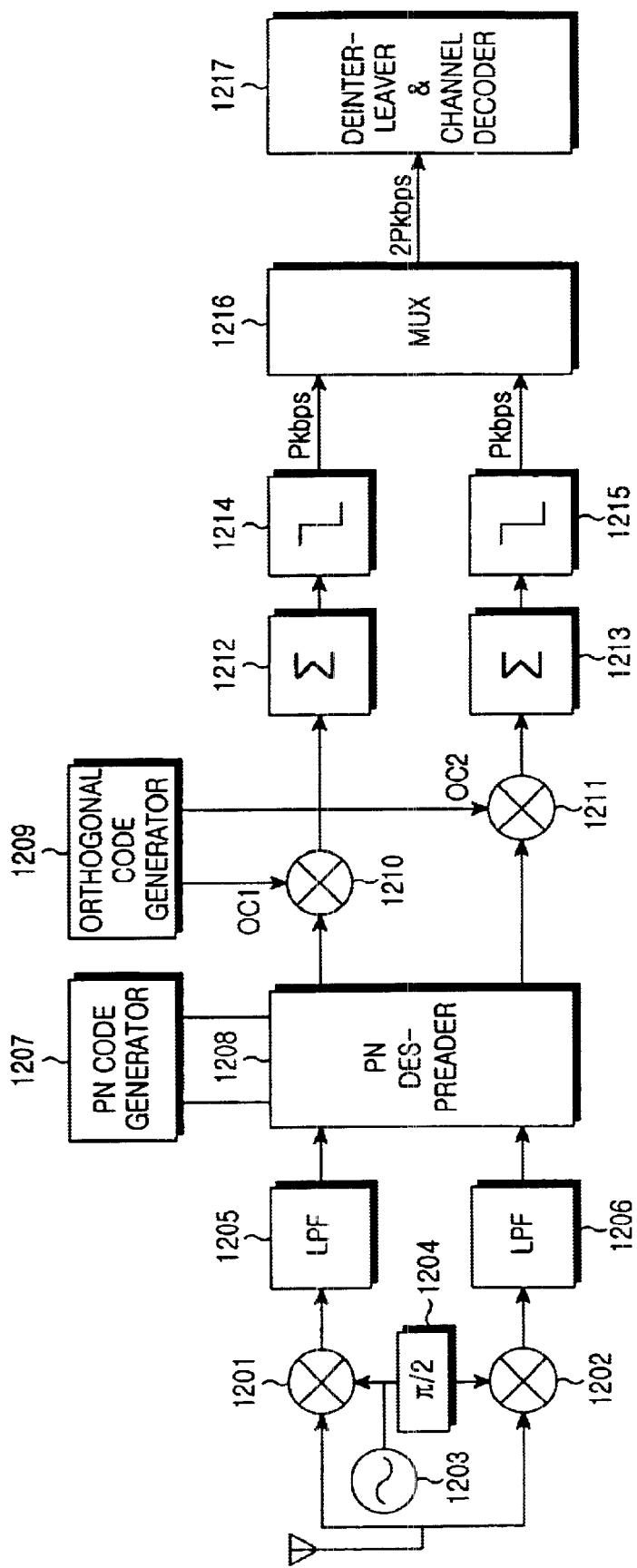
FIG. 12 is a block diagram of a mobile station receiver corresponding to, the BS transmitter.

An MS receiver corresponding to the BS transmitter of FIG. 9 is illustrated in FIG. 12.

Referring to FIG. 12, a carrier generator 1203 generates a carrier for an intended received signal. A phase shifter 1204 shifts the phase of the output of the carrier generator 1203 by 90°. A mixer 1201 multiplies the received signal by the output of the carrier generator 1203. A mixer 1202 multiplies the received signal by the output of the phase shifter 1204. LPFs 1205 and 1206 perform low-pass filtering of the outputs of the mixers 1201 and 1202, respectively. A PN code generator 1207 generates the two PN codes PN_I and PN_Q. A PN despreader 1208 performs complex multiplication between the outputs of the LPFs 1205 and 1206 by the PN codes PN_I and PN_Q received from the PN code generator 1207, for despreading. An orthogonal code generator 1209 generates the first and second orthogonal codes OC1 and OC2 in the same layer which have been used in the transmitter. A mixer 1210 multiplies the output of the PN despreader 1208 by the first orthogonal code OC1. A mixer 1211 multiplies the output of the PN despreader 1208 by the second orthogonal code OC2. Accumulators 1212 and 1213 accumulate the outputs of the mixers 1210 and 1211 in symbol units. Decision units 1214 and 1215 decide the signs of the outputs of the accumulators 1212 and 1213. If the channel decoder 1217 soft decoding the decision unit 1214 and 1215 is not needed. A multiplexer (MUX) 1216 multiplexes the outputs of the decision units 1214 and 1215. A deinterleaver & channel decoder 1217 deinterleaver and channel-decodes the output of the MUX 1216.

A detailed description of a handoff implementing procedure according to the present invention will be given hereinbelow referring to FIGS. 10 and 11.

Figure 10:
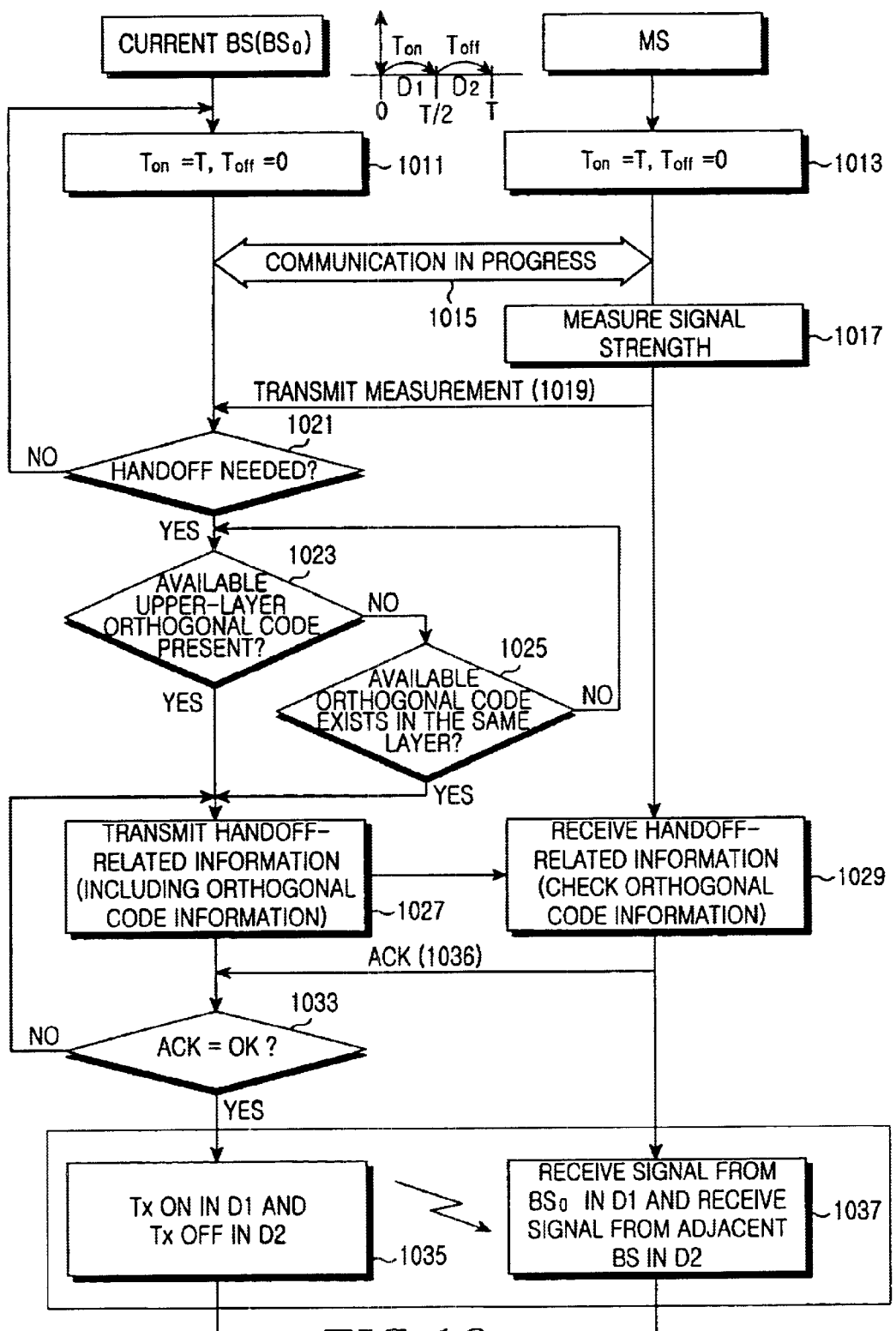
FIG. 10 is a flowchart depicting a handoff implementing procedure in the multicode scheme in the mobile communication system according to the embodiment of the present invention.

FIG. 10 is a flowchart depicting a handoff implementing procedure using variable spread gains and a multicode scheme according to an embodiment of the present invention. In FIG. 10, D1 indicates the first half of a frame period and D2 indicates the last half of the frame period. $T_{on}$ is a time period when a BS transmits data to an MS, and $T_{off}$ is a time period when the BS transmits no data.

Referring to FIG. 10, the BS transmits data for a time $T_{on}$=T in step 1011, and the MS receives the data in step 1013. The BS continues communication with the MS in step 1015. The MS measures the strength of a signal received from the BS in step 1017 and notifies the BS of the measurement if the signal strength is at the threshold or below in step 1019. Then. the BS determines whether a handoff is requested based on the measurement in step 1021. Upon request for a handoff, the BS goes to step 1023, otherwise, the BS returns to step 1011 to transmit data for a time $T_{on}$=T again. In step 1023, the BS determines whether there is an available upper-layer orthogonal code. If an upper layer orthogonal code is available, the BS goes to step 1027 if an upper layer is not available it goes to step 1025. In step 1025, the BS then determines whether there is an available orthogonal code in the same layer. If an orthogonal code is available in the same layer, the BS goes to step 1027, otherwise, it returns to step 1023 to determine whether an available upper layer orthogonal code has become available. In step 1027, the BS transmits handoff-related information including the orthogonal code (i.e., the upper layer orthogonal code or the identical layer orthogonal code) to the MS. Then, the MS receives the handoff-related information in step 1029 and transmits an acknowledgment signal ACK to the BS, notifying the reception status of the handoff-related information in step 1031. The BS determines whether the acknowledgment signal ACK has been received from the MS in step 1033. Upon reception of the acknowledgment signal ACK, the BS goes to step 1035, and otherwise, it returns to step 1027 to resume transmission of the handoff-related information. In step 1035, the BS spreads data at a transmission rate $T/T_{on}$ times higher (where $T_{on}$ is T/2 and thus $T/T_{on}$ is 2) using either selected orthogonal code (i.e., the upper layer orthogonal code or the identical layer orthogonal code) and transmits the spread data for a time $T_{on}$ of D1. Then, the MS receives the spread data in D1 and a signal from an adjacent BS in D2 to thereby search for a new BS for the handoff.

Figure 11:
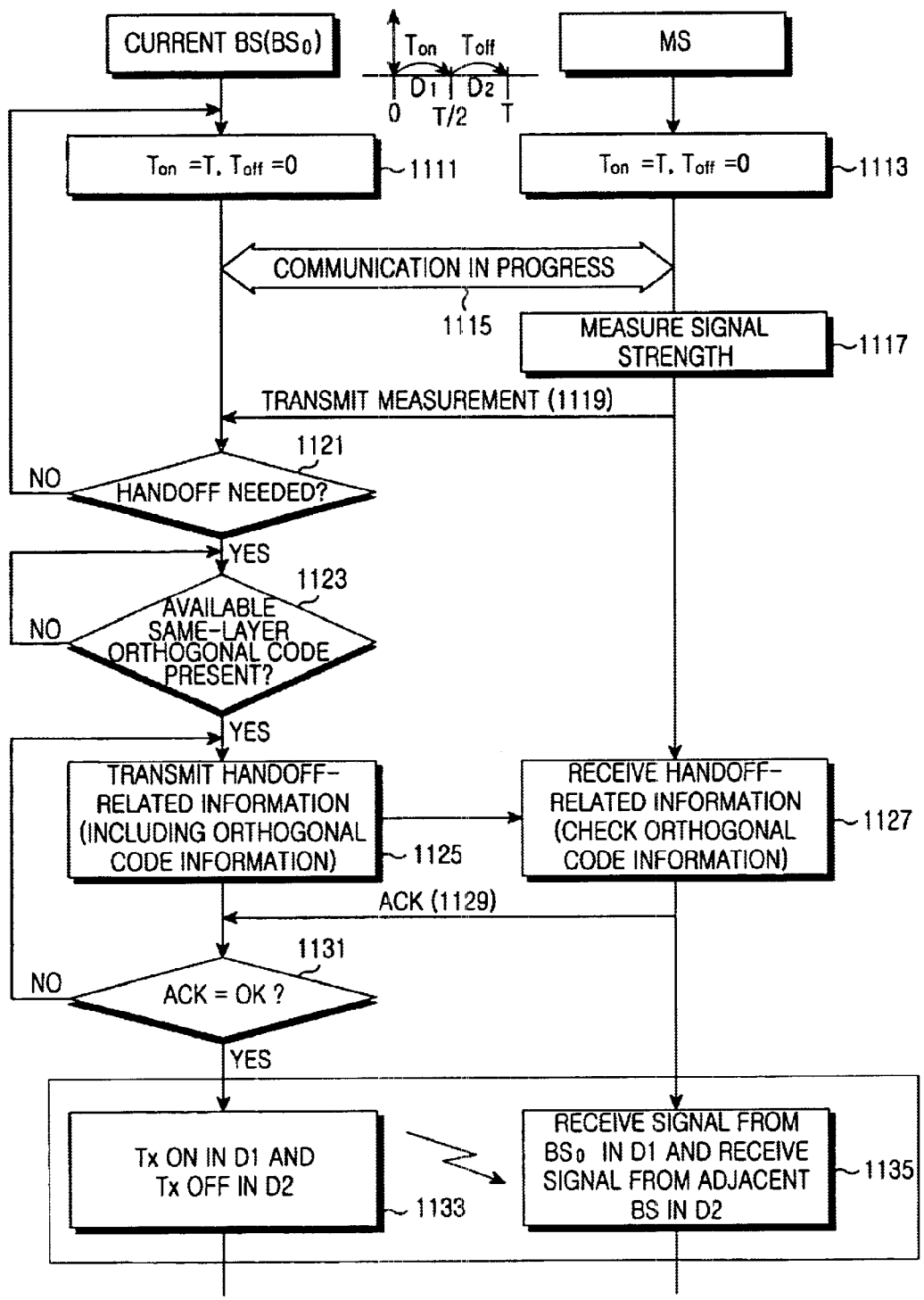
FIG. 11 is a flowchart depicting another embodiment of the handoff implementing procedure in the multicode scheme in the mobile communication system.

FIG. 11 is a flowchart depicting another embodiment of the handoff implementing procedure using a multicode scheme according to the present invention.

Referring to FIG. 11, the BS transmits data for a time $T_{on}$ =T in step 1111, and the MS receives the data in step 1113. The BS continues communication with the MS in step 1115. The MS measures the strength of a signal received from the BS in step 1117 and notifies the BS of the measurement if the signal strength is at the threshold or below in step 1119. Then, the BS determines whether a handoff is requested based on the measurement in step 1121. Upon request for a handoff, the BS goes to step 1123, otherwise, the BS returns to step 1111 to transmit data for a time $T_{on}$ =T again. In step 1123, the BS determines whether there is an available same-layer orthogonal code. In the presence of the available same layer orthogonal code, the BS goes to step 1125 otherwise it awaits generation of an available same-layer orthogonal code in step 1123. In step 1125, the BS transmits handoff-related information including an orthogonal code in the same layer to the MS. Then, the MS receives the handoff-related information in step 1127 and transmits an acknowledgment signal ACK to the BS, notifying the reception status of the handoff-related information in step 1129. The BS determines whether the acknowledgment signal ACK has been received from the MS in step 1131. Upon reception of the acknowledgment signal ACK, the BS goes to step 1133, otherwise it returns to step 1125 to resume transmission of the handoff-related information. In step 1133, the BS spreads data at a transmission rate $T/T_{on}$ times higher (where $T_{on}$ is T/2 and thus $T/T_{on}$ is 2) with the orthogonal code in the same layer and transmits the spread data for $T_{on}$ of D1. Then, the MS receives the spread data in D1 and a signal from an adjacent BS in D2 to thereby search for a new BS for the handoff in step 1135.

In accordance with the first embodiment of the present invention, if an available orthogonal code exists in an upper layer, the orthogonal code is assigned and used in slotted modes 1 or 2. In the absence of any available orthogonal code in the upper layer, it is determined whether an available orthogonal code exists in the same layer. In the presence of the orthogonal code in the same layer, a handoff is implemented in a multicode scheme. In the absence of the orthogonal code in the same layer, the above procedure is repeated until either an upper layer or same layer code becomes available.

In accordance with the second embodiment of the present invention, a handoff is implemented in a slotted mode in the multicode scheme without using variable spread gains. That is, upon request for a handoff, the slotted mode is operated in the multicode scheme if there is an orthogonal code in the same layer as an orthogonal code in current use. Therefore, an inter-frequency handoff is implemented in a slotted mode in the multicode scheme using another orthogonal code in the same layer.

The present invention suggests a method of implementing a handoff in a multicode scheme in the case that an upper layer orthogonal code cannot be assigned for the handoff in a mobile communication system. That is, the conventional problem that a handoff cannot be implemented due to absence of an available upper-layer orthogonal code. Furthermore, the original orthogonal code can still be used when a slotted mode is over, thereby obviating the need for an additional control signal for reassignment of an orthogonal code and supporting a more efficient handoff.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A base station (BS) transmitting device for transmitting frames with multicode scheme in a transmission period of a frame period when the handoff is required, the frame period being divided into the transmission period and a non-transmission period, and the frame period requiring an increase in the data rate during the transmission period to compensate for the loss of data transmission during the non-transmission period, the device comprising:
   a demultiplexer for separating frame data in the frame period into first data and second data;
   a first spreader for spreading the first data by a first orthogonal code and generating a first spread signal;
   a second spreader for spreading the second data by a second orthogonal code and generating a second spread signal;
   a PN spreader for spreading the first and second spread signals by respective PN codes in the transmission period to generate a handoff frame signal; and
   a transmitter for transmitting the handoff frame signal,
   wherein the first orthogonal code and the second orthogonal code are mutually orthogonal with each other and are in the same hierarchical layer, and
   wherein a mobile station (MS) searches for an adjacent base station (BS) to which a call is handed off in the non-transmission period in the frame period.

2. A mobile station (MS) receiving device for receiving a handoff frame signal in a multicode scheme in a transmission period of a frame period, the frame period being divided into the transmission period and a non-transmission period, and the frame period having an increase in the data rate during the transmission period to compensate for the loss of data transmission during the non-transmission period, the device comprising:
   a PN despreader for despreading the handoff frame signal by a PN code and generating a PN despread signal;
   an orthogonal despreader for despreading the PN despread signal by first and second orthogonal codes and generating first and second data; and
   a multiplexer for multiplexing the first and second data and outputting frame data,
   wherein the first orthogonal code and the second orthogonal code are mutually orthogonal with each other and are in the same hierarchical layer, and
   wherein a mobile station (MS) searches for an adjacent base station (BS) to which a call is handed off in the non-transmission period in the frame period.

3. A transmitting method for a base station BS in a CDMA communication system, for transmitting a handoff frame signal in a multicode scheme in a transmission period of a frame period, the frame period being divided into the transmission period and a non-transmission period, and the frame period requiring an increase in the data rate during the transmission period to compensate for the loss of data transmission during the non-transmission period, the method comprising the steps of:
   separating frame data in the frame period into first and second data;
   spreading the first and second data by first and second orthogonal codes and generating first and second spread signals; and spreading the first and second spread signals by PN codes and generating the handoff frame signal; and converting the handoff frame signal to a radio frequency signal and transmitting the radio frequency signal in the transmission period, wherein the first orthogonal code and the second orthogonal code are mutually orthogonal with each other and are in the same hierarchical layer, and wherein a mobile station (MS) searches for an adjacent base station (BS) to which a call is handed off I the non-transmission period in the frame period.

4. A receiving method in an MS, for receiving a handoff frame signal in a multicode scheme in a transmission period of a frame period, the frame period being divided into the transmission period and a non-transmission period, and the frame period having an increase in the data rate during the transmission period to compensate for the loss of data transmission during the non-transmission period, the device comprising:

despreading the handoff frame signal by a PN code and generating a PN despread signal;

despreading the PN despread signal by first and second orthogonal codes and generating first and second data; and multiplexing the first and second data and generating frame data, wherein the first orthogonal code and the second orthogonal code are mutually orthogonal with each other and are in the same hierarchical layer, and wherein a mobile station (MS) searches for an adjacent base station (BS) to which a call is handed off in the non-transmission period in the frame period.

5. A handoff implementing device in a CDMA communication system, comprising:

a BS transmitter for dividing a given frame period into a transmission period and a non-transmission period, the frame period requiring an increase in the data rate during the transmission period to compensate for the loss of data transmission during the non-transmission period, separating frame data in the frame period into first and second data, spreading the first and second data by first and second orthogonal codes, said first and second orthogonal codes spread data at the same data rate and being orthogonal to each other, and transmitting the spread signal in the transmission period; and an MS receiver for receiving the first and second data spread by the first and second orthogonal codes in the transmission period, assembling the first and second data into the frame data, and searching for an adjacent BS to which a call is handed off in the non-transmission period, wherein the first orthogonal code and the second orthogonal code are mutually orthogonal with each other and are in the same hierarchical layer.

6. A handoff implementing method in a CDMA communication system, comprising the steps of:

measuring the strength of a signal received from a BS in communication with an MS and notifying the BS of the measurement by the MS;

determining whether a handoff should be performed or not based on the measurement by the BS;

selecting an orthogonal code different from an orthogonal code in current use from the same layer upon request for the handoff by the BS, the current and different orthogonal codes spreading data at the same data rate and being orthogonal to each other;

dividing a given frame period into a transmission period and a non-transmission period, separating frame data in the frame period into first and second data, and the frame period requiring an increase in the data rate during the transmission period to compensate for the loss of data transmission during the non-transmission period, spreading the first and second data by the current and different orthogonal codes respectively, and transmitting the spread signal in the transmission period by the BS;

receiving the first and second data spread by the current and different orthogonal codes in the transmission period, and assembling the first and second data into the frame data by the MS; and searching for an adjacent BS to which a call is handed off in the non-transmission period by the MS.

* * * * *